United States Patent
Zhou et al.

(10) Patent No.: US 12,368,545 B2
(45) Date of Patent: *Jul. 22, 2025

(54) METHOD AND DEVICE FOR INDICATING SUB-BAND CONFIGURATION, AND METHOD AND DEVICE FOR ACCESSING SUB-BAND

(71) Applicant: SPREADTRUM COMMUNICATIONS (SHANGHAI) CO., LTD., Shanghai (CN)

(72) Inventors: Huayu Zhou, Shanghai (CN); Weijie Xu, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/414,512

(22) Filed: Jan. 17, 2024

(65) Prior Publication Data

US 2024/0195542 A1 Jun. 13, 2024

Related U.S. Application Data

(63) Continuation of application No. 17/060,258, filed on Oct. 1, 2020, now Pat. No. 11,916,813, which is a (Continued)

(30) Foreign Application Priority Data

Jul. 29, 2016 (CN) .......................... 201610615466.1

(51) Int. Cl.
*H04L 5/00* (2006.01)
*H04W 48/12* (2009.01)
(Continued)

(52) U.S. Cl.
CPC .......... *H04L 5/0007* (2013.01); *H04L 5/0053* (2013.01); *H04L 5/0094* (2013.01);
(Continued)

(58) Field of Classification Search
CPC ... H04L 5/0005; H04L 5/0053; H04L 5/0007; H04W 56/0005; H04W 48/12; H04W 72/042
See application file for complete search history.

(56) References Cited

U.S. PATENT DOCUMENTS 8,706,076 B2    4/2014   Lee et al.
10,833,819 B2   11/2020   Zhou et al.
(Continued)

FOREIGN PATENT DOCUMENTS

CN     103945536 A    7/2014
WO   2016025899 A1   2/2016

OTHER PUBLICATIONS

USPTO Notice of Allowance dated Oct. 18, 2023; U.S. Appl. No. 17/060,258; 11 pages.
(Continued)

*Primary Examiner* — Redentor Pasia
(74) *Attorney, Agent, or Firm* — CANTOR COLBURN LLP

(57) ABSTRACT

Method and device for indicating sub-band configuration, and method and device for accessing sub-band are provided. The method for indicating sub-band configuration includes: configuring a broadcast channel in a basic sub-band which is configured with a synchronization signal; and indicating sub-band configuration of at least one non-basic sub-band directly or indirectly through a master information block carried by the broadcast channel, wherein the sub-band configuration of the non-basic sub-band is used for user equipment accessing the non-basic sub-band, and comprises
(Continued)

configuring a broadcast channel in a basic sub-band which is configured with a synchronization signal — S101 indicating sub-band configuration of at least one non-basic sub-band directly or indirectly through a MIB carried by the broadcast channel — S102 a frequency position. UE may access different sub-bands efficiently with relatively high flexibility and relatively few signaling overhead.

14 Claims, 2 Drawing Sheets

Related U.S. Application Data continuation of application No. 15/453,312, filed on Mar. 8, 2017, now Pat. No. 10,833,819.

(51) Int. Cl.
*H04W 56/00* (2009.01)
*H04W 72/044* (2023.01)
*H04W 72/23* (2023.01)

(52) U.S. Cl.
CPC ....... *H04W 48/12* (2013.01); *H04W 56/0005* (2013.01); *H04W 72/23* (2023.01); *H04W 72/044* (2013.01)

(56) References Cited

U.S. PATENT DOCUMENTS

| | | |
|---|---|---|
| 2013/0077582 A1 | 3/2013 | Kim et al. |
| 2013/0215834 A1 | 8/2013 | Deivasigamani et al. |
| 2014/0334416 A1 | 11/2014 | Ko et al. |
| 2015/0043491 A1 | 2/2015 | Eng et al. |
| 2015/0245378 A1 | 8/2015 | Kim et al. |
| 2015/0327284 A1 | 11/2015 | Wakabayashi |
| 2016/0088571 A1 | 3/2016 | Choi et al. |
| 2016/0100403 A1 | 4/2016 | Han et al. |
| 2016/0212737 A1* | 7/2016 | Jang .................... H04L 65/1073 |
| 2017/0201968 A1 | 7/2017 | Nam et al. |
| 2017/0244537 A1 | 8/2017 | Yu et al. |
| 2017/0279646 A1 | 9/2017 | Yi et al. |
| 2017/0280481 A1 | 9/2017 | Stern-Berkowitz et al. |
| 2017/0347268 A1* | 11/2017 | Chen .................... H04L 5/0044 |
| 2018/0006779 A1 | 1/2018 | Yi et al. |
| 2018/0034599 A1 | 1/2018 | Zhou |
| 2018/0092101 A1* | 3/2018 | Xia ....................... H04W 72/23 |
| 2018/0167954 A1 | 6/2018 | Wakabayashi |
| 2018/0176753 A1 | 6/2018 | Kim et al. |
| 2018/0337752 A1 | 11/2018 | Choi et al. |
| 2019/0387518 A1* | 12/2019 | Au ........................ H04W 72/20 |
| 2020/0008203 A1* | 1/2020 | Xia ....................... H04W 72/23 |
| 2020/0106561 A1 | 4/2020 | Choi et al. |
| 2021/0021388 A1 | 1/2021 | Zhou |

OTHER PUBLICATIONS

CNIPA First Office Action for corresponding CN Application No. CN201610615466.1; dated May 3, 2018; 9 pages; English summary included.
USPTO Final Office Action dated May 19, 2022; U.S. Appl. No. 17/060,258; 35 pages.
USPTO Final Office Action dated May 22, 2023; U.S. Appl. No. 17/060,258; 22 pages.
USPTO Final Office Action dated Sep. 30, 2019; U.S. Appl. No. 15/453,312; 19 pages.
USPTO Non-Final Office Action dated Jan. 9, 2020; U.S. Appl. No. 15/453,312; 22 pages.
USPTO Non-Final Office Action dated Oct. 27, 2021; U.S. Appl. No. 17/060,258; 39 pages.
USPTO Non-Final Office Action dated Oct. 27, 2022; U.S. Appl. No. 17/060,258; 20 pages.
USPTO Non-Final Office Action dated Mar. 21, 2019; U.S. Appl. No. 15/453,312; 22 pages.
USPTO Non-Final Office Action dated Aug. 27, 18; U.S. Appl. No. 15/453,312; 19 pages.

* cited by examiner

METHOD AND DEVICE FOR INDICATING SUB-BAND CONFIGURATION, AND METHOD AND DEVICE FOR ACCESSING SUB-BAND

CROSS-REFERENCE TO RELATED APPLICATIONS

The present application is a Continuation Application of the U.S. patent application Ser. No. 17/060,258 filed on Oct. 1, 2020, and which is a Continuation Application of the U.S. patent application Ser. No. 15/453,312 filed on Mar. 8, 2017 (U.S. Pat. No. 10,833,819 issued on Nov. 10, 2020), which claims priority to Chinese patent application No. 201610615466.1, filed on Jul. 29, 2016; the entire disclosure of which is incorporated herein by reference.

TECHNICAL FIELD

The present disclosure generally relates to the communication field, and more particularly, to method and device for indicating sub-band configuration, and method and device for accessing sub-band.

BACKGROUND

In $5^{th}$ Generation (5G) mobile communication systems, multiple sub-bands may have different carrier configurations and waveform configurations. The carrier configuration includes a sub-carrier spacing, Cyclic Prefix (CP) length and so on. Sub-bands with different configurations can provide different services for User Equipment (UE), such as enhanced Mobile Broad Band (eMBB), Ultra Reliable Low Latency Communication (URLLC) or Massive Machine Type Communication (M-MTC).

In existing techniques, as regulated in the 3rd Generation Partnership Project (3GPP) standard, multiple frequency or time portions with different carrier configurations (for example, multiple sub-bands with different carrier configurations) can use a same synchronization signal. For example, in a Long-Term Evolution (LTE) system, a synchronization signal carries Physical Cell ID (PCI), a ten-millisecond timing, a type of CP (common CP length or extended CP length) and so on. These information can be shared by multiple sub-bands; thus, the multiple sub-bands can use the same synchronization signal.

However, when the multiple sub-bands use the same synchronization signal, some problems arise and need to be solved, for example, how to make UE access different sub-bands efficiently with relatively high flexibility and relatively few signaling overhead.

SUMMARY

In embodiments of the present disclosure, a UE may access different sub-bands efficiently.

In an embodiment of the present disclosure, a method for indicating sub-band configuration is provided, including: configuring a broadcast channel in a basic sub-band which is configured with a synchronization signal; and indicating sub-band configuration of at least one non-basic sub-band directly or indirectly through a master information block carried by the broadcast channel, wherein the sub-band configuration of the non-basic sub-band is used for user equipment accessing the non-basic sub-band.

Optionally, the master information block carried by the broadcast channel may be a master information block with expanded bits and indicating sub-band configuration of at least one non-basic sub-band directly through the master information block carried by the broadcast channel may include: indicating sub-band configuration of at least one non-basic sub-band through the master information block with expanded bits.

Optionally, a resource position of the broadcast channel may have a first predetermined offset with a resource position of the synchronization signal, and the master information block carried by the broadcast channel may indicate bandwidth of the basic sub-band and an offset between a center frequency point of the basic sub-band and a center frequency point of the synchronization signal.

Optionally, a resource position of the synchronization signal may have a second predetermined offset with a resource position of a common control channel, and the common control channel has been subjected to resource expansion.

Optionally, indicating sub-band configuration of at least one non-basic sub-band indirectly through the master information block carried by the broadcast channel may include: indicating an offset between the resource position of the common control channel and the resource position of the synchronization signal through the master information block carried by the broadcast channel; and indicating sub-band configuration of the at least one non-basic sub-band through a system information block carried by the common control channel, wherein a time-frequency resource of the common control channel is located within the basic sub-band.

Optionally, the method may further include: carrying paging information and/or random access feedback information through the system information block carried by the common control channel.

Optionally, the sub-band configuration may include at least one of the following: carrier configuration, waveform configuration, frequency position and measurement reference signal configuration.

In an embodiment of the present disclosure, a method for accessing a sub-band is provided, including: detecting a synchronization signal and a broadcast channel in a basic sub-band to obtain a master information block carried by the broadcast channel, and camping on a cell according to the synchronization signal; decoding the master information block carried by the broadcast channel to determine sub-band configuration of at least one non-basic sub-band; and accessing the at least one non-basic sub-band based on the sub-band configuration of the at least one non-basic sub-band, when data interaction through the at least one non-basic sub-band is required.

Optionally, the master information block carried by the broadcast channel may be decoded to determine a resource position of a control channel, and accessing the at least one non-basic sub-band based on the sub-band configuration of the at least one non-basic sub-band when data interaction through the at least one non-basic sub-band is required may include: detecting the control channel periodically; and randomly accessing the at least one non-basic sub-band based on the sub-band configuration of the at least one non-basic sub-band, when data interaction through the at least one non-basic sub-band is required.

Optionally, decoding the master information block carried by the broadcast channel to determine sub-band configuration of at least one non-basic sub-band may include: decoding the master information block with expanded bits to determine the sub-band configuration of the at least one non-basic sub-band.

Optionally, decoding the master information block carried by the broadcast channel to determine sub-band configuration of at least one non-basic sub-band may include: decoding the master information block carried by the broadcast channel to obtain configuration of a common control channel; decoding the common control channel based on the configuration of the common control channel to determine a system information block carried by the common control channel; and decoding the system information block carried by the common control channel to determine the sub-band configuration of the at least one non-basic sub-band.

Optionally, the sub-band configuration may include at least one of the following: carrier configuration, waveform configuration, frequency position and measurement reference signal configuration.

Optionally, detecting a synchronization signal and a broadcast channel in a basic sub-band to obtain a master information block carried by the broadcast channel, and camping on a cell according to the synchronization signal may include: detecting the synchronization signal in the basic sub-band to obtain a time-frequency position of a base station; and measuring a measurement reference signal based on the measurement reference signal configuration to become synchronous with the base station and camp on a cell corresponding to the base station.

In an embodiment of the present disclosure, a device for indicating sub-band configuration is provided, including: a broadcast channel configuring circuitry configured to configure a broadcast channel in a basic sub-band which is configured with a synchronization signal; and a sub-band configuring circuitry configured to indicate sub-band configuration of at least one non-basic sub-band directly or indirectly through a master information block carried by the broadcast channel, wherein the sub-band configuration of the non-basic sub-band is used for user equipment accessing the non-basic sub-band.

Optionally, the master information block carried by the broadcast channel may be a master information block with expanded bits, and the sub-band configuring circuitry may be configured to indicate sub-band configuration of at least one non-basic sub-band through the master information block with expanded bits.

Optionally, a resource position of the broadcast channel may have a first predetermined offset with a resource position of the synchronization signal, and the master information block carried by the broadcast channel may indicate bandwidth of the basic sub-band and an offset between a center frequency point of the basic sub-band and a center frequency point of the synchronization signal.

Optionally, a resource position of the synchronization signal may have a second predetermined offset with a resource position of a common control channel, and the common control channel has been subjected to resource expansion.

Optionally, the sub-band configuring circuitry may include: an indication sub-circuitry configured to indicate an offset between the resource position of the common control channel and the resource position of the synchronization signal through the master information block carried by the broadcast channel; and a configuring sub-circuitry configured to indicate sub-band configuration of the at least one non-basic sub-band through a system information block carried by the common control channel, wherein a time-frequency resource of the common control channel is located within the basic sub-band.

Optionally, the device may further include an access configuring sub-circuitry, configured to carry paging information and/or random access feedback information through the system information block carried by the common control channel.

Optionally, the sub-band configuration may include at least one of the following: carrier configuration, waveform configuration, frequency position and measurement reference signal configuration.

In an embodiment of the present disclosure, a device for accessing a sub-band is provided, including: a detecting circuitry configured to detect a synchronization signal and a broadcast channel in a basic sub-band to obtain a master information block carried by the broadcast channel, and camp on a cell according to the synchronization signal; a decoding circuitry configured to decode the master information block carried by the broadcast channel to determine sub-band configuration of at least one non-basic sub-band; and an accessing circuitry configured to access the at least one non-basic sub-band based on the sub-band configuration of the at least one non-basic sub-band, when data interaction through the at least one non-basic sub-band is required.

Optionally, the master information block carried by the broadcast channel may be decoded to determine a resource position of a control channel, and the accessing circuitry is configured to detect the control channel periodically, and randomly access the at least one non-basic sub-band based on the sub-band configuration of the at least one non-basic sub-band, when data interaction through the at least one non-basic sub-band is required.

Optionally, the decoding circuitry may be configured to decode the master information block with expanded bits to determine the sub-band configuration of the at least one non-basic sub-band.

Optionally, the decoding circuitry may include: a broadcast channel decoding sub-circuitry configured to decode the master information block carried by the broadcast channel to obtain configuration of a common control channel; a common control channel decoding sub-circuitry configured to decode the common control channel based on the configuration of the common control channel to determine a system information block carried by the common control channel; and a sub-band configuration determining sub-circuitry configured to decode the system information block carried by the common control channel to determine the sub-band configuration of the at least one non-basic sub-band.

Optionally, the sub-band configuration may include at least one of the followings: carrier configuration, waveform configuration, frequency position and measurement reference signal configuration.

Optionally, the detecting circuitry may include: a detecting sub-circuitry configured to detect the synchronization signal in the basic sub-band to obtain a time-frequency position of a base station; and a measuring sub-circuitry configured to measure a measurement reference signal based on the measurement reference signal configuration to become synchronous with the base station and camp on a cell corresponding to the base station.

In an embodiment of the present disclosure, a method, applied for user equipment, for accessing a sub-band is provided, including: transmitting, in a connected mode, application information to a base station, where the base station transmits a system information block with sub-band configuration of a non-basic sub-band based on indication of the application information; receiving and decoding the system information block to obtain the sub-band configuration of the non-basic sub-band; and accessing the non-basic sub-band based on the sub-band configuration of the non-basic sub-band.

Optionally, the system information block may be carried in a shared channel or a data channel.

In an embodiment of the present disclosure, a device, applied for user equipment, for accessing a sub-band is provided, including: an application transmitting circuitry configured to transmit, in a connected mode, application information to a base station, where the base station transmits a system information block with sub-band configuration of a non-basic sub-band based on indication of the application information; configuration receiving circuitry configured to receive and decode the system information block to obtain the sub-band configuration of the non-basic sub-band; and an accessing circuitry configured to access the non-basic sub-band based on the sub-band configuration of the non-basic sub-band.

Optionally, the system information block may be carried in a shared channel or a data channel.

Embodiments of the present disclosure may provide the following advantages. A broadcast channel is configured in a basic sub-band which is configured with a synchronization signal, and sub-band configuration of at least one non-basic sub-band is indicated directly or indirectly through a master information block carried by the broadcast channel, wherein the sub-band configuration of the non-basic sub-band is used for user equipment accessing the non-basic sub-band. In the embodiments, the synchronization signal and the broadcast channel are configured together, so that the multiple sub-bands can share the broadcast channel. Besides, by indicating the sub-band configuration of the at least one non-basic sub-band directly or indirectly through the master information block carried by the broadcast channel, the user equipment, when decoding, obtains not only the master information block but also the sub-band configuration of the at least one non-basic sub-band, so that the user equipment can access the at least one non-basic sub-band based on the sub-band configuration of the at least one non-basic sub-band. In the embodiments of the present disclosure, the user equipment may access different sub-bands efficiently with relatively high flexibility and relatively few signaling overhead.

Further, the master information block carried by the broadcast channel may be a master information block with expanded bits, and the common control channel has been subjected to resource expansion. The sub-band configuration of the at least one non-basic sub-band is indicated through the master information block with expanded bits, or the system information block carried by the common control channel, which ensures the flexibility of indication of the sub-band configuration.

Further, by paging information and/or random access feedback information carried in the system information block carried by the common control channel, the user equipment, when decoding, obtains not only the sub-band configuration of the at least one non-basic sub-band but also the paging information and/or the random access feedback information based on which the user equipment can determine whether to access the at least one non-basic sub-band. Besides, signaling overhead may be saved.

DETAILED DESCRIPTION

As described in the background, when multiple sub-bands use a same synchronization signal, some problems arise and need to be solved, for example, how to make UE access different sub-bands efficiently with relatively high flexibility and relatively few signaling overhead.

In embodiments of the present disclosure, to make a UE access different sub-bands efficiently, how to design channels belonging to a broadcast type (such as a broadcast channel or a common control channel) is considered to make the UE access different sub-bands according to configuration of the channels.

In 5G systems, to support various application scenarios and deployment scenarios, multiple sub-bands may be multiplexed in one carrier. A sub-band may be a subset of continuous frequency resources in one carrier, and different sub-bands may have different sub-band configurations.

In order to clarify the object, solutions and advantages of embodiments of the present disclosure, embodiments of present disclosure will be described clearly in detail in conjunction with accompanying drawings.

Figure 1:
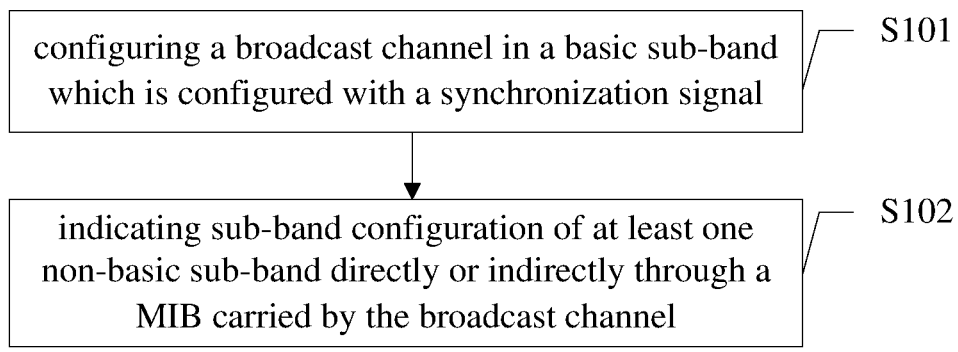
FIG. 1 schematically illustrates a flow chart of a method for indicating sub-band configuration according to an embodiment.

FIG. 1 schematically illustrates a flow chart of a method for indicating sub-band configuration according to an embodiment.

The method may be applied for a base station. In some embodiments, the method may include:

S101, configuring a broadcast channel in a basic sub-band which is configured with a synchronization signal; and S102, indicating sub-band configuration of at least one non-basic sub-band directly or indirectly through a master information block (MIB) carried by the broadcast channel.

In some embodiments, the sub-band configuration of the at least one non-basic sub-band is used for UE accessing the at least one non-basic sub-band.

In some embodiments, when multiple sub-bands use a same synchronization signal, the sub-band the synchronization signal is located is a basic sub-band, which is also called an initial access sub-band. Generally, the synchronization signal includes information of cell ID, information of initial time-frequency synchronization with a base station, timing information related to frame structure and so on. The UE can detect the synchronization signal through blind detection and acquire the MIB and a System Information Block (SIB) by decoding the broadcast channel and/or a common control channel, so that the UE can camp on the basic sub-band. In some embodiments, the UE detects the synchronization signal to obtain a time-frequency position of the base station (that is, the UE is coarsely synchronous with the base station in time and frequency), and further obtains a time-frequency position of a measurement reference signal of the basic sub-band based on bandwidth of the basic sub-band and a frequency position of the synchronization signal indicated in the MIB carried by the broadcast channel.

In some embodiments, time and position information of the measurement reference signal of the basic sub-band may be predetermined. After obtaining the time-frequency position of a measurement reference signal, the UE becomes synchronous with the base station in time and frequency by measuring the measurement reference signal, and performs Radio Resource Management (RRM) measurement, so that the UE can camp on the basic sub-band. In some embodiments, the MIB carried by the broadcast channel at least indicates bandwidth of the basic sub-band and an offset between a center frequency point of the basic sub-band and a center frequency point of the synchronization signal.

In S101, the broadcast channel is configured in the basic sub-band which is configured with the synchronization signal. The broadcast channel is a channel for a base station transmitting messages to all the UEs in a cell, which is a common channel. At least one non-basic sub-band can share the broadcast channel in the basic sub-band. Further, the broadcast channel can carry an MIB, and information in the MIB is in a system level. Therefore, at least one non-basic sun-band can share the MIB. Further, the MIB carried by the broadcast channel may further include other common information, such as Physical Hybrid ARQ Indicator Channel (PHICH) configuration or System Frame Number (SFN).

In some embodiments, a time-frequency resource position of the broadcast channel may have a predetermined offset with a time-frequency resource position of the synchronization signal, so that the UE can determine and decode the broadcast channel conveniently.

In some embodiments, in S102, the sub-band configuration of the at least one non-basic sub-band is indicated directly or indirectly through the MIB carried by the broadcast channel, so that the sub-band configuration of the at least one non-basic sub-band may be informed to the UE by a network (for example, the base station).

In some embodiments, the sub-band configuration of the basic sub-band and the non-basic sub-band may include at least one of the followings: carrier configuration, waveform configuration, frequency position and measurement reference signal configuration. The carrier configuration includes a sub-carrier spacing and CP length. The waveform configuration includes different wave types and/or parameters, for example, the wave types may include Orthogonal Frequency Division Multiplexing (OFDM) or Discrete Fourier Transform-Spreading-OFDM (DFT-S-OFDM). The frequency position is a frequency position the sub-band is located. In some embodiments, the frequency position may include an offset relative to a center frequency point of the basic sub-band and bandwidth the sub-band occupies. The measurement reference signal configuration may include a time-frequency position and a complex value of the measurement reference signal, and may be represented by period, bandwidth or sequence.

In some embodiments, the carrier configuration, the waveform configuration and the frequency position may determine the measurement reference signal configuration. In some embodiments, the measurement reference signal may be predetermined to occupy the whole bandwidth of the sub-band, and have a predetermined period and lasting period, in which case no measurement reference signal configuration needs to be indicated.

For example, the sub-carrier spacing in the carrier configuration may have two options including 15 KHz and 60 KHz which can be indicated by one bit. The CP length in the carrier configuration may have two options including common CP length and extended CP length which can be indicated by one bit. The waveform configuration may have two options including OFDM and DFT-S-OFDM which can be indicated by one bit. The frequency position may be indicated based on predetermined frequency band segmentation. For example, a carrier with bandwidth of 80 MHz may be divided into eight sub-bands with bandwidth of 10 MHz, four sub-bands with bandwidth of 20 MHz or two sub-bands with bandwidth of 40 MHz. Therefore, two bits may be used to indicate the bandwidth of the sub-bands and left one to three bits may indicate a segmentation index of occupied frequency bands. The measurement reference signal configuration may be predetermined to occupy the whole sub-band bandwidth, and two bits may be used for indicating configuration of four periods and a lasting period.

In the embodiments, the synchronization signal and the broadcast channel are configured together, so that the multiple sub-bands can share the broadcast channel. Besides, by indicating the sub-band configuration of the at least one non-basic sub-band directly or indirectly through the MIB carried by the broadcast channel, the UE, when decoding, obtains not only the MIB but also the sub-band configuration of the at least one non-basic sub-band, so that the UE can access the at least one non-basic sub-band based on the sub-band configuration of the at least one non-basic sub-band. In the embodiments of the present disclosure, the UE may access different sub-bands efficiently with relatively high flexibility and relatively few signaling overhead.

In some embodiments, the MIB carried by the broadcast channel may be an MIB with expanded bits and indicating sub-band configuration of at least one non-basic sub-band directly through the MIB carried by the broadcast channel may include: indicating sub-band configuration of at least one non-basic sub-band through the MIB with expanded bits.

As the at least one non-basic sub-band supports different services, there may be much information of the sub-band configuration of the at least one non-basic sub-band. As a result, the MIB carried by the broadcast channel may have relatively great length to carry more information. Therefore, in some embodiments, the MIB carried by the broadcast channel may be an MIB with expanded bits, that is to say, the MIB may have been subjected to bit expansion.

It should be noted that bit expansion to the MIB may be performed in any feasible way, for example, through changing a bit rate, which is not limited in embodiments of the present disclosure.

In some embodiments, the common control channel may have been subjected to resource expansion.

As the at least one non-basic sub-band supports different services, there may be much information of the sub-band configuration of the at least one non-basic sub-band. As a result, the MIB carried by the broadcast channel may have relatively great length to carry more information. Therefore, in some embodiments, the common control channel may have been subjected to resource expansion. By the resource expansion, the SIB carried by the common control channel may carry more information.

In some embodiments, the common control channel may indicate different sub-band configurations to correspond to different types of service, such as enhanced mobile wideband service, communication service with high reliability and low latency or communication service of large-scale machine type.

In some embodiments, a resource position of the broadcast channel may have a first predetermined offset with a resource position of the synchronization signal. In this way, after determining the synchronization signal, the UE may determine the resource position of the broadcast channel according to the first predetermined offset, and further obtain the sub-band configuration of the at least one non-basic sub-band indicated by the MIB carried by the broadcast channel. In some embodiments, the first predetermined offset may be an offset in a time domain, such as shifted symbols, slots or sub-frames, or an offset in a frequency domain, such as a positively or negatively shifted Resource Block (RB).

In some embodiments, a position of the common control channel in the frequency domain may be the same as a position of the synchronization signal in the frequency domain or as a position of the synchronization signal in the time domain. Bandwidth of the common control channel may be the same as bandwidth of the synchronization signal.

In some embodiments, paging information and/or random access feedback information may be carried in the SIB carried by the common control channel. The UE obtains the paging information and/or the random access feedback information by decoding the common control channel, based on which the UE can determine whether to access the non-basic sub-band.

In some embodiments, indicating sub-band configuration of at least one non-basic sub-band indirectly through the MIB carried by the broadcast channel may include: indicating an offset between the resource position of the common control channel and the resource position of the synchronization signal through the MIB carried by the broadcast channel; and indicating sub-band configuration of the at least one non-basic sub-band through the SIB carried by the common control channel, wherein a time-frequency resource of the common control channel is located within the basic sub-band.

In some embodiments, the SIB carried by the common control channel may indicate the sub-band configuration of the at least one non-basic sub-band and further carry physical layer control information used for broadcast.

In some embodiments, the configuration of the common control channel may be indicated by the MIB carried by the broadcast channel and include a time-frequency resource position and a period of the common control channel.

Specifically, the common control channel may be located in a predetermined time-frequency resource position, and the synchronization signal and the broadcast channel may be inserted into the time-frequency resource of the common control channel. Reference signals used for RRM measurement, and reference signals used for the broadcast channel and the common control channel are transmitted in a broadcast mode. Therefore, the reference signals used for demodulating the broadcast channel and/or the common control channel may be a subset of the reference signals used for RRM measurement.

In some embodiments, paging information and/or random access feedback information may be carried in the SIB carried by the common control channel. The UE obtains the paging information and/or the random access feedback information by decoding the common control channel, based on which the UE can determine whether to access the non-basic sub-band.

In some embodiments, a resource position of the common control channel may have a second predetermined offset with the resource position of the synchronization signal. In this way, after determining the synchronization signal, the UE may determine the resource position of the common control channel according to the second predetermined offset. In some embodiments, the second predetermined offset may be an offset in the time domain, such as shifted symbols, slots or sub-frames, or an offset in the frequency domain, such as a positively or negatively shifted RB.

In some embodiments, the synchronization signal, the broadcast channel and the common control channel may be time division multiplexed, have a same center frequency point, and be adjacent in the time domain. For example, they occupy K continuous symbols, where K is an integer. The synchronization signal and the broadcast channel may have same bandwidth, for example, 1.4 MHz. In this way, after detecting the synchronization signal to become coarsely synchronized with the base station, the UE can rapidly determine the time-frequency resource position of the broadcast channel. In some embodiments, the common control channel may have bandwidth of 5 MHz, so that it can carry more information bits and more measurement reference signals. The offset between the center frequency point of the common control channel and the center frequency point of the synchronization signal may be predetermined or indicated by the MIB carried by the broadcast channel.

In some embodiments, the synchronization signal and the broadcast channel may be time division multiplexed, and the common control channel and an RB consisting of the synchronization signal and the broadcast channel may be frequency division multiplexed, so that the synchronization signal, the broadcast channel and the common control channel may be located in a same sub-frame or slot, and the synchronization signal and the broadcast channel may have a same center frequency point and be adjacent in the time domain. For example, the synchronization signal and the broadcast channel occupy L continuous symbols, where L is an integer. The synchronization signal and the broadcast channel may have same bandwidth, for example, 1.4 MHz. In this way, after detecting the synchronization signal to become coarsely synchronized with the base station, the UE can rapidly determine the time-frequency resource position of the broadcast channel. In some embodiments, the common control channel may have bandwidth of 5 MHz, so that it can carry more information bits and more measurement reference signals. The offset between the center frequency point of the common control channel and the center frequency point of the synchronization signal may be predetermined or indicated by the MIB carried by the broadcast channel.

Figure 2:
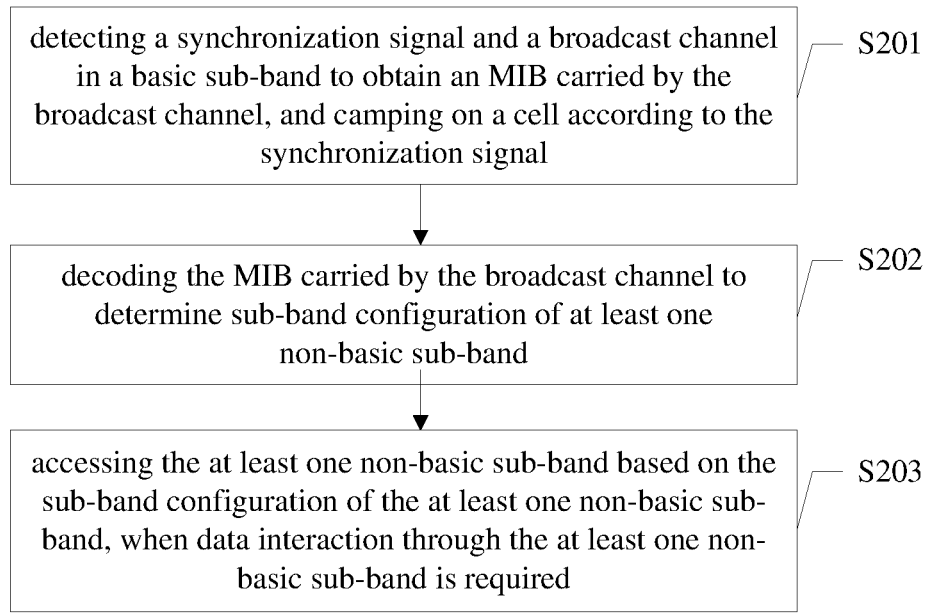
FIG. 2 schematically illustrates a flow chart of a method for accessing a sub-band according to an embodiment.

FIG. 2 schematically illustrates a flow chart of a method for accessing a sub-band according to an embodiment.

The method may be applied for a UE, and includes:
S201, detecting a synchronization signal and a broadcast channel in a basic sub-band to obtain an MIB carried by the broadcast channel, and camping on a cell according to the synchronization signal;
S202, decoding the MIB carried by the broadcast channel to determine sub-band configuration of at least one non-basic sub-band; and
S203, accessing the at least one non-basic sub-band based on the sub-band configuration of the at least one non-basic sub-band, when data interaction through the at least one non-basic sub-band is required.

In some embodiments, in S201, according to the detected synchronization signal in the basic sub-band, the UE camps on the corresponding cell, and is in an idle mode. In some embodiments, the synchronization signal includes information of cell ID, information of initial time frequency synchronization with a base station, timing information related to frame structure and so on.

In some embodiments, a time-frequency resource position of the broadcast channel may have a predetermined offset with a time-frequency resource position of the synchronization signal, so that the UE can determine the broadcast channel when detecting the synchronization signal and further obtain the MIB carried by the broadcast channel.

In S202, as the MIB carried by the broadcast channel can directly or indirectly indicate the sub-band configuration of the at least one non-basic sub-band, the UE can determine the sub-band configuration of the at least one non-basic sub-band by decoding the MIB carried by the broadcast channel.

In S203, when data interaction through the at least one non-basic sub-band is required, the UE accessing the at least one non-basic sub-band based on the sub-band configuration of the at least one non-basic sub-band. That is to say, the UE may initiate a random access procedure at this time and convert from an idle mode to a connected mode to perform data interaction with the base station.

In some embodiments, data interaction through the at least one non-basic sub-band being required may include at least one of the following situations: the UE being scheduled to the non-basic sub-band to transmit and receive data, the UE actively needing to transmit data on the non-basic sub-band or paging information being detected on the non-basic sub-band by the UE.

In some embodiments, the UE may determine a resource position of a control channel by decoding the MIB carried by the broadcast channel which indicates bandwidth of the basic sub-band or bandwidth of the control channel. The UE obtains necessary information for detecting (i.e., decoding) the control channel by the decoding and starts to detect (i.e., decode) the control channel.

In some embodiments, accessing the at least one non-basic sub-band based on the sub-band configuration of the at least one non-basic sub-band when data interaction through the at least one non-basic sub-band is required may include: detecting the control channel periodically; and randomly accessing the at least one non-basic sub-band based on the sub-band configuration of the at least one non-basic sub-band, when data interaction through the at least one non-basic sub-band is required. Data interaction through the at least one non-basic sub-band being required may include at least one of the following situations: the UE being scheduled to the non-basic sub-band to transmit and receive data, the UE actively needing to transmit data on the non-basic sub-band or paging information being detected on the non-basic sub-band by the UE. In some embodiments, data interaction through the at least one non-basic sub-band is required when the paging information is detected through the control channel, when the UE needs to register to a network (such as register after power on) or when the UE needs to transmit data (such as initiate a call).

As the SIB carried by the common control channel can carry paging information and/or random access feedback information, when the paging information and/or the random access feedback information is detected in the SIB carried by the common control channel, the UE may initiate a random access procedure and convert from the idle mode to the connected mode to start the data interaction with the base station.

In some embodiments, decoding the MIB carried by the broadcast channel to determine sub-band configuration of at least one non-basic sub-band may include: decoding the MIB with expanded bits to determine the sub-band configuration of the at least one non-basic sub-band.

In some embodiments, decoding the MIB carried by the broadcast channel to determine sub-band configuration of at least one non-basic sub-band may include: decoding the SIB carried by the common control channel to determine the sub-band configuration of the at least one non-basic sub-band.

In some embodiments, decoding the MIB carried by the broadcast channel to determine sub-band configuration of at least one non-basic sub-band may include: decoding the MIB carried by the broadcast channel to obtain configuration of a common control channel; decoding the common control channel based on the configuration of the common control channel to determine the SIB carried by the common control channel; and decoding the SIB carried by the common control channel to determine the sub-band configuration of the at least one non-basic sub-band.

Details of the embodiments for the method for accessing a sub-band may be referred to the details of the embodiments for the method for indicating sub-band configuration and are not described in detail here.

In an embodiment, a method, applied for UE, for accessing a sub-band is provided, including: transmitting, in a connected mode, application information to a base station, where the base station transmits an SIB with sub-band configuration of a non-basic sub-band based on indication of the application information; receiving and decoding the SIB to obtain the sub-band configuration of the non-basic sub-band; and accessing the non-basic sub-band based on the sub-band configuration of the non-basic sub-band.

In some embodiments, the SIB may be carried in a shared channel or a data channel.

In an embodiment, a device, applied for UE, for accessing a sub-band is provided, including: an application transmitting circuitry configured to transmit, in a connected mode, application information to a base station, where the base station transmits an SIB with sub-band configuration of a non-basic sub-band based on indication of the application information; configuration receiving circuitry configured to receive and decode the SIB to obtain the sub-band configuration of the non-basic sub-band; and an accessing circuitry configured to access the non-basic sub-band based on the sub-band configuration of the non-basic sub-band.

In some embodiments, the SIB may be carried in a shared channel or a data channel.

In some embodiments, the UE may obtain the sub-band configuration of the non-basic sub-band by application. The sub-band configuration of the non-basic sub-band may be indicated by the SIB. The UE obtains the sub-band configuration of the non-basic sub-band by decoding the SIB.

In some embodiments, the non-basic sub-band is only used for UE in a connected mode. Namely, a UE in an idle mode does not camp on the non-basic sub-band. Therefore, SIB indicating the sub-band configuration of the non-basic sub-band may be transmitted in an on-demand mode. That is to say, only if the UE in the connected mode applies for the sub-band configuration of the non-basic sub-band, the base station transmits the SIB indicating the sub-band configuration of the non-basic sub-band to the UE.

In some embodiments, the SIB may be transmitted in a data channel or a shared channel.

Figure 3:
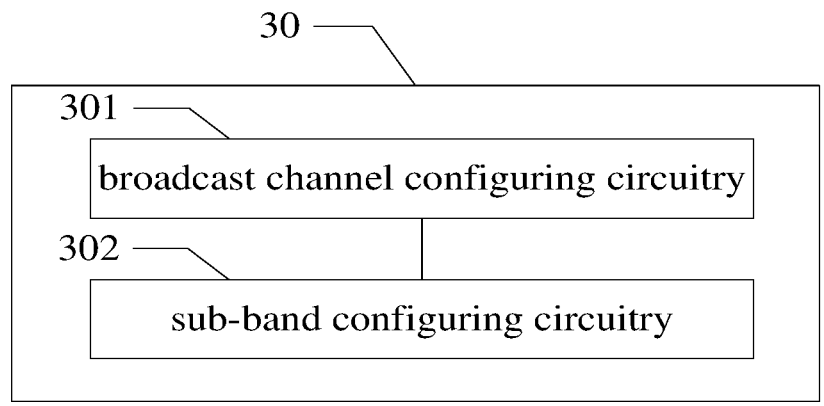
FIG. 3 schematically illustrates a structural diagram of a device for indicating sub-band configuration according to an embodiment.

FIG. 3 schematically illustrates a structural diagram of a device for indicating sub-band configuration according to an embodiment.

The device 30 for indicating sub-band configuration may be applied for a UE and include a broadcast channel configuring circuitry 301 and a sub-band configuring circuitry 302.

In some embodiments, the broadcast channel configuring circuitry 301 may be configured to configure a broadcast channel in a basic sub-band which is configured with a synchronization signal. The sub-band configuring circuitry 302 may be configured to indicate sub-band configuration of at least one non-basic sub-band directly or indirectly through an MIB carried by the broadcast channel, wherein the sub-band configuration of the non-basic sub-band is used for UE accessing the non-basic sub-band.

In some embodiments, the MIB carried by the broadcast channel may be an MIB with expanded bits, and the sub-band configuring circuitry 302 may be configured to indicate sub-band configuration of at least one non-basic sub-band through the MIB with expanded bits.

In some embodiments, the sub-band configuring circuitry 302 may include an indication sub-circuitry and a configuring sub-circuitry (not shown in figures). The indication sub-circuitry may be configured to indicate an offset between the resource position of the common control channel and the resource position of the synchronization signal through the MIB carried by the broadcast channel. The configuring sub-circuitry may be configured to indicate sub-band configuration of the at least one non-basic sub-band through an SIB carried by the common control channel, wherein a time-frequency resource of a common control channel is located within the basic sub-band.

In some embodiments, a resource position of the broadcast channel may have a first predetermined offset with a resource position of the synchronization signal, and a resource position of the common control channel may have a second predetermined offset with the resource position of the synchronization signal.

Details of the embodiments for the device for indicating sub-band configuration may be referred to the details of the embodiments for the method for indicating sub-band configuration and are not described in detail here.

Figure 4:
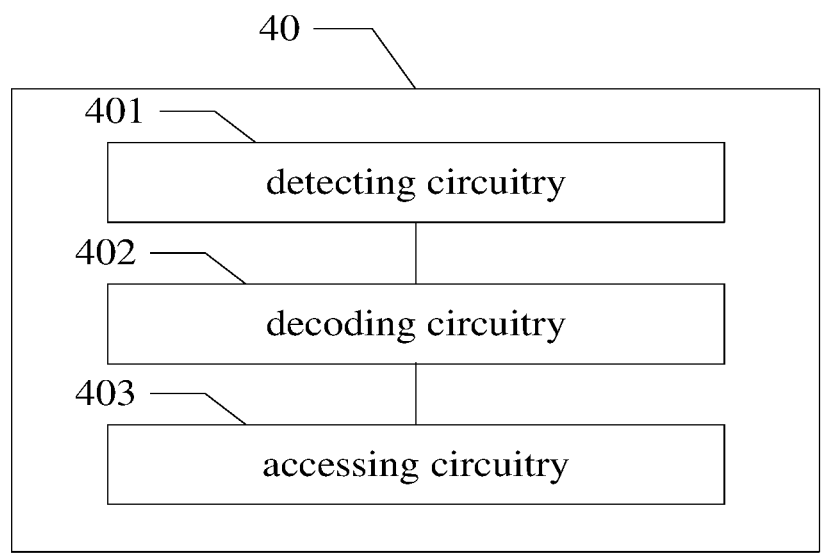
FIG. 4 schematically illustrates a structural diagram of a device for accessing a sub-band according to an embodiment.

FIG. 4 schematically illustrates a structural diagram of a device for accessing a sub-band according to an embodiment.

The device 40 may be applied for a UE, and include a detecting circuitry 401, a decoding circuitry 402 and an accessing circuitry 403.

The detecting circuitry 401 may be configured to detect a synchronization signal and a broadcast channel in a basic sub-band to obtain an MIB carried by the broadcast channel, and camp on a cell according to the synchronization signal. The decoding circuitry 402 may be configured to decode the MIB carried by the broadcast channel to determine sub-band configuration of at least one non-basic sub-band. The accessing circuitry 403 may be configured to access the at least one non-basic sub-band based on the sub-band configuration of the at least one non-basic sub-band, when data interaction through the at least one non-basic sub-band is required.

In some embodiments, the MIB carried by the broadcast channel may be decoded to determine a resource position of a control channel, and the accessing circuitry 403 may be configured to detect the control channel periodically, and randomly access the at least one non-basic sub-band based on the sub-band configuration of the at least one non-basic sub-band, when data interaction through the at least one non-basic sub-band is required.

In some embodiments, the decoding circuitry 402 may be configured to decode the MIB with expanded bits to determine the sub-band configuration of the at least one non-basic sub-band.

In some embodiments, the decoding circuitry 402 may include a broadcast channel decoding sub-circuitry, a common control channel decoding sub-circuitry and a sub-band configuration determining sub-circuitry (not shown in figures). The broadcast channel decoding sub-circuitry may be configured to decode the MIB carried by the broadcast channel to obtain configuration of a common control channel. The common control channel decoding sub-circuitry may be configured to decode the common control channel based on the configuration of the common control channel to determine an SIB carried by the common control channel.

The sub-band configuration determining sub-circuitry may be configured to decode the SIB carried by the common control channel to determine the sub-band configuration of the at least one non-basic sub-band.

Details of the embodiments for the device for accessing a sub-band may be referred to the details of the embodiments for the method for accessing a sub-band and are not described in detail here.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for indicating sub-band configuration, comprising:
configuring a broadcast channel in a basic sub-band which is configured with a synchronization signal; and
indicating sub-band configuration of at least one non-basic sub-band indirectly through a master information block carried by the broadcast channel, wherein the sub-band configuration of the non-basic sub-band is used for user equipment accessing the non-basic sub-band, and comprises a frequency position,
wherein indicating sub-band configuration of at least one non-basic sub-band indirectly through the master information block carried by the broadcast channel comprises: indicating configuration of a common control channel based on the master information block carried by the broadcast channel, wherein the configuration of the common control channel comprises a time-frequency resource position of the common control channel; and indicating sub-band configuration of the at least one non-basic sub-band through a system information block carried by the common control channel.

2. The method according to claim 1, wherein a resource position of the broadcast channel has a first predetermined offset with a resource position of the synchronization signal, and the master information block carried by the broadcast channel indicates bandwidth of the basic sub-band and an offset between a center frequency point of the basic sub-band and a center frequency point of the synchronization signal.

3. The method according to claim 1, wherein a resource position of the synchronization signal has a second predetermined offset with a resource position of the common control channel, and the common control channel has been subjected to resource expansion.

4. The method according to claim 3, further comprising: carrying paging information and/or random access feedback information through the system information block carried by the common control channel.

5. The method according to claim 1, further comprising: carrying paging information and/or random access feedback information through the system information block carried by the common control channel.

6. The method according to claim 1, wherein the sub-band configuration further comprises waveform configuration and measurement reference signal configuration.

7. A method for accessing a sub-band, comprising:
  detecting a synchronization signal and a broadcast channel in a basic sub-band to obtain a master information block carried by the broadcast channel, and camping on a cell according to the synchronization signal;
  decoding the master information block carried by the broadcast channel to determine sub-band configuration of at least one non-basic sub-band, wherein the sub-band configuration comprises a frequency position; and
  accessing the at least one non-basic sub-band based on the sub-band configuration of the at least one non-basic sub-band, when data interaction through the at least one non-basic sub-band is required,
  wherein decoding the master information block carried by the broadcast channel to determine sub-band configuration of at least one non-basic sub-band comprises:
    decoding the master information block carried by the broadcast channel to obtain configuration of a common control channel, wherein the configuration of the common control channel comprises a time-frequency resource position of the common control channel;
    decoding the common control channel based on the configuration of the common control channel to determine a system information block carried by the common control channel; and decoding the system information block carried by the common control channel to determine the sub-band configuration of the at least one non-basic sub-band.

8. The method according to claim 7, wherein the master information block carried by the broadcast channel is decoded to determine a resource position of a control channel, and accessing the at least one non-basic sub-band based on the sub-band configuration of the at least one non-basic sub-band when data interaction through the at least one non-basic sub-band is required comprises: detecting the control channel periodically; and randomly accessing the at least one non-basic sub-band based on the sub-band configuration of the at least one non-basic sub-band, when data interaction through the at least one non-basic sub-band is required.

9. The method according to claim 7, wherein the sub-band configuration further comprises waveform configuration and measurement reference signal configuration.

10. The method according to claim 9, wherein detecting a synchronization signal and a broadcast channel in a basic sub-band to obtain a master information block carried by the broadcast channel, and camping on a cell according to the synchronization signal comprises: detecting the synchronization signal in the basic sub-band to obtain a time-frequency position of a base station; and measuring a measurement reference signal based on the measurement reference signal configuration to become synchronous with the base station and camp on a cell corresponding to the base station.

11. A device for accessing a sub-band, comprising:
  a detecting circuitry configured to detect a synchronization signal and a broadcast channel in a basic sub-band to obtain a master information block carried by the broadcast channel, and camp on a cell according to the synchronization signal;
  a decoding circuitry configured to decode the master information block carried by the broadcast channel to determine sub-band configuration of at least one non-basic sub-band, wherein the sub-band configuration comprises a frequency position; and
  an accessing circuitry configured to access the at least one non-basic sub-band based on the sub-band configuration of the at least one non-basic sub-band, when data interaction through the at least one non-basic sub-band is required,
  wherein the decoding circuitry comprises:
    a broadcast channel decoding sub-circuitry configured to decode the master information block carried by the broadcast channel to obtain configuration of a common control channel, wherein the configuration of the common control channel comprises a time-frequency resource position of the common control channel;
    a common control channel decoding sub-circuitry configured to decode the common control channel based on the configuration of the common control channel to determine a system information block carried by the common control channel; and
    a sub-band configuration determining sub-circuitry configured to decode the system information block carried by the common control channel to determine the sub-band configuration of the at least one non-basic sub-band.

12. The device according to claim 11, wherein the master information block carried by the broadcast channel is decoded to determine a resource position of a control channel, and the accessing circuitry is configured to detect the control channel periodically, and randomly access the at least one non-basic sub-band based on the sub-band configuration of the at least one non-basic sub-band, when data interaction through the at least one non-basic sub-band is required.

13. The device according to claim 11, wherein the sub-band configuration further comprises waveform configuration and measurement reference signal configuration.

14. The device according to claim 13, wherein the detecting circuitry comprises:
  a detecting sub-circuitry configured to detect the synchronization signal in the basic sub-band to obtain a time-frequency position of a base station; and
  a measuring sub-circuitry configured to measure a measurement reference signal based on the measurement reference signal configuration to become synchronous with the base station and camp on a cell corresponding to the base station.

* * * * *